United States Patent
Schlafli et al.

(10) Patent No.: US 11,175,423 B2
(45) Date of Patent: Nov. 16, 2021

(54) REAL TIME DEFORMATION OF SEISMIC SLICES USING PROGRAMMABLE SHADERS

(71) Applicant: Schlumberger Technology Corporation, Sugar Land, TX (US)

(72) Inventors: Markus Schlafli, Mountain View, CA (US); Hallgrim Ludvigsen, Stavanger (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 16/902,162

(22) Filed: Jun. 15, 2020

(65) Prior Publication Data
US 2021/0055439 A1 Feb. 25, 2021

Related U.S. Application Data

(60) Provisional application No. 62/890,187, filed on Aug. 22, 2019.

(51) Int. Cl.
*G01V 1/34* (2006.01)
*G01V 1/18* (2006.01)
(Continued)

(52) U.S. Cl.
CPC .............. *G01V 1/345* (2013.01); *G01V 1/181* (2013.01); *G06T 15/005* (2013.01); *G06T 15/04* (2013.01);
(Continued)

(58) Field of Classification Search
CPC .............. G01V 1/345; G01V 2210/66; G01V 2210/643; G01V 2210/641; G01V 1/302; G01V 2210/48; G01V 2210/63; G01V 11/00; G01V 1/301; G01V 1/34; G01V 1/00; G01V 1/282; G01V 1/306; G01V 1/32; G01V 1/003; G01V 1/181; G01V 2210/1425; G01V 2210/64; G06T 15/04; G06T 15/506; G06T 17/05; G06T 15/005;
(Continued)

(56) References Cited

U.S. PATENT DOCUMENTS 6,765,570 B1 * 7/2004 Cheung ................... G06T 15/08
    345/420
8,059,137 B2 * 11/2011 Hanggie ............... G06F 3/0481
    345/619

(Continued)

OTHER PUBLICATIONS

Drebin, et al., "Volume Rendering," Computer Graphics, vol. 22, No. 4, Aug. 1988, pp. 65-74.
(Continued)

*Primary Examiner* — Abderrahim Merouan
(74) *Attorney, Agent, or Firm* — Jaime Castano (57) ABSTRACT

A method, apparatus, and program product render a seismic slice in real time and in a computationally-efficient manner using a displacement mapping technique implemented in one or more programmable shaders of a graphics processing unit (GPU), e.g., using programmable shaders in a GPU to perform both tessellation and displacement of primitives in connection with rendering a displacement-mapped visualization of the seismic slice for display in an interactive 3D visualization environment.

19 Claims, 7 Drawing Sheets

(51) Int. Cl.
*G06T 17/20* (2006.01)
*G06T 15/00* (2011.01)
*G06T 15/04* (2011.01)

(52) U.S. Cl.
CPC ...... *G06T 17/20* (2013.01); *G01V 2210/1425* (2013.01); *G01V 2210/643* (2013.01)

(58) Field of Classification Search
CPC ...... G06T 15/08; G06T 17/20; H04M 11/007; H04M 11/066; H04M 5/00; H04Q 3/545; G06F 30/00; G06F 30/23; G06F 17/00; E21B 43/12
See application file for complete search history.

(56) References Cited

U.S. PATENT DOCUMENTS

| | | | | |
|---|---|---|---|---|
| 2002/0172401 A1* | 11/2002 | Lees | ............ | G01V 1/30 382/109 |
| 2003/0117528 A1* | 6/2003 | Liang | ............ | H04N 5/262 348/578 |
| 2004/0098200 A1* | 5/2004 | Wentland | ............ | G01V 11/00 702/2 |
| 2005/0114831 A1* | 5/2005 | Callegari | ............ | G06T 17/05 717/104 |
| 2006/0253759 A1* | 11/2006 | Wei | ............ | G01V 1/282 714/738 |
| 2008/0059074 A1* | 3/2008 | Wei | ............ | G01V 1/34 702/16 |
| 2008/0165186 A1* | 7/2008 | Lin | ............ | G06T 15/08 345/419 |
| 2009/0295798 A1* | 12/2009 | Goel | ............ | G06T 17/20 345/423 |
| 2011/0054857 A1* | 3/2011 | Moguchaya | ............ | G01V 99/00 703/2 |
| 2011/0115787 A1* | 5/2011 | Kadlec | ............ | G06T 7/12 345/419 |
| 2013/0112407 A1* | 5/2013 | Cheng | ............ | E21B 43/12 166/250.15 |
| 2013/0229891 A1* | 9/2013 | Witte | ............ | G01V 1/34 367/9 |
| 2014/0035940 A1* | 2/2014 | Dmitriev | ............ | G06T 15/04 345/582 |
| 2014/0177390 A1* | 6/2014 | Can | ............ | G01V 1/302 367/73 |
| 2015/0339852 A1* | 11/2015 | Plowman | ............ | G06T 15/005 345/423 |
| 2016/0349389 A1* | 12/2016 | Walters | ............ | G01V 1/50 |
| 2016/0379335 A1* | 12/2016 | Kwon | ............ | G06T 1/20 345/506 |
| 2017/0169544 A1* | 6/2017 | Boulkenafed | ............ | G06T 17/005 |
| 2017/0248713 A1* | 8/2017 | Ascough | ............ | G01V 1/282 |
| 2018/0225868 A1* | 8/2018 | Bize | ............ | E21B 47/00 |

OTHER PUBLICATIONS

Lynch, "The Visual Wavefield Project, The Home of Perceptive Seismic Interpretation," retrieved at https://www.visualwavefield.com/ on Jun. 15, 2020.

* cited by examiner

```
┌─────────────────────────────────────────────────────────┐
│ GENERATE A SEISMIC PLANE USING A CPU OF A COMPUTING     │
│ SYSTEM, WHERE THE SEISMIC PLANE INCLUDES GEOMETRIC      │
│ PRIMITIVE(S) AND CORRESPONDING VERTICES                 │
│                         402                             │
└─────────────────────────────────────────────────────────┘
                            │
                            ▼
┌─────────────────────────────────────────────────────────┐
│ GENERATE A SEISMIC TEXTURE REPRESENTING A PORTION OF    │
│ THREE DIMENSIONAL SEISMIC DATA USING THE CPU            │
│                         404                             │
└─────────────────────────────────────────────────────────┘
                            │
                            ▼
┌─────────────────────────────────────────────────────────┐
│ TESSELLATE THE SEISMIC PLANE TO INCREASE THE NUMBER OF  │
│ GEOMETRIC PRIMITIVES USING A GPU OF THE COMPUTING SYSTEM│
│                         406                             │
└─────────────────────────────────────────────────────────┘
                            │
                            ▼
┌─────────────────────────────────────────────────────────┐
│ OFFSET THE VERTICES IN THE SEISMIC PLANE BASED ON A     │
│ CORRESPONDING PORTION OF THE SEISMIC TEXTURE USING THE  │
│ GPU                                                     │
│                         408                             │
└─────────────────────────────────────────────────────────┘
                            │
                            ▼
┌─────────────────────────────────────────────────────────┐
│ GENERATE A SEISMIC SLICE USING THE SEISMIC TEXTURE AND  │
│ THE OFFSET SEISMIC PLANE USING THE GPU                  │
│                         410                             │
└─────────────────────────────────────────────────────────┘
                            │
                            ▼
┌─────────────────────────────────────────────────────────┐
│ CAUSE THE COMPUTING SYSTEM TO RENDER THE SEISMIC SLICE  │
│                         412                             │
└─────────────────────────────────────────────────────────┘
```

REAL TIME DEFORMATION OF SEISMIC SLICES USING PROGRAMMABLE SHADERS

CROSS REFERENCE TO RELATED APPLICATIONS

This application claims the benefit of priority to U.S. Provisional Patent Application Ser. No. 62/890,187, filed on Aug. 22, 2019, which is hereby incorporated in its entirety for all intents and purposes by this reference.

BACKGROUND

Simulation and modeling software are used throughout the oil & gas industry for exploration, appraisal, development and production of oil fields. In addition, visualization tools incorporated into or external to such software may be used to display and manipulate representations of petroleum reservoirs that are modeled as large volumes subdivided into cells, with each cell storing properties of the reservoir in particular locations in the reservoir. For example, three-dimensional seismic data may be collected from a subsurface formation to characterize the substructure of a region of the earth, with the substructure identifying potential areas containing recoverable hydrocarbons. In order to visualize the seismic data, seismic "slices," which capture cross sections of seismic data, may be generated and displayed to users to assist with interpretation of the seismic data. An entire seismic dataset may be rendered using a sequence of seismic slices; however, moving from one slice to the next can be time consuming due to the computing resources and time required to render each slice. Furthermore, seismic slices are generally rendered as two-dimensional grayscale or color textures, which have been found to be difficult to interpret.

Therefore, a need continues to exist for a manner of rendering seismic slices in a computationally efficient and understandable manner.

SUMMARY

The implementations disclosed herein provide a method, apparatus, and program product that render a seismic slice in real time and in a computationally-efficient manner using a displacement mapping technique implemented in one or more programmable shaders of a graphics processing unit (GPU), e.g., using programmable shaders in a GPU to perform both tessellation and displacement of primitives in connection with rendering a displacement-mapped visualization of the seismic slice for display in an interactive 3D visualization environment.

Therefore, consistent with one aspect of the invention, a method of rendering a seismic slice in real time may include generating a seismic plane, including generating a seismic texture for the seismic plane based on stored seismic data for a subsurface formation, tessellating the seismic plane using a graphics processing unit (GPU) to generate a plurality of geometric primitives with a plurality of corresponding vertices, displacing vertices from the plurality of geometric primitives of the seismic plane based on corresponding portions of the seismic texture using the GPU, and generating a displacement mapped rendering of the seismic slice using the displaced vertices for display in an interactive three-dimensional (3D) visualization environment.

In some embodiments, generating the seismic plane and generating the seismic texture are performed using a central processing unit (CPU) coupled to the GPU. Also, in some embodiments, generating the seismic plane includes generating one or more geometric primitives, and tessellating the seismic plane generates additional geometric primitives to those generated when generating the seismic plane.

In addition, some embodiments may further include dynamically adjusting a number of geometric primitives generated when tessellating the seismic plane in response to user input. Further, in some embodiments, displacing the vertices is further based on a scaling factor, and the method further includes dynamically adjusting the scaling factor in response to user input. In some embodiments, displacing the vertices includes offsetting the vertices based on amplitude parameters associated with the corresponding portions of the seismic texture.

In some embodiments, the GPU includes a tessellation shader, and tessellating the seismic plane is performed by the tessellation shader. In some embodiments, displacing the vertices is performed by the tessellation shader. In addition, in some embodiments, the tessellation shader is a programmable shader of the GPU programmed to tessellate the seismic plane. Moreover, in some embodiments, the GPU includes a fragment shader, and generating the displacement mapped rendering of the seismic slice includes mapping a value in a color lookup table for a corresponding portion of the seismic texture using the fragment shader.

Some embodiments may also include, subsequent to generating the displacement mapped rendering of the seismic slice, receiving user input that selects a different seismic slice, in response to receiving the user input, generating a second seismic plane, including generating a second seismic texture for the second seismic plane based on the stored seismic data for the subsurface formation, tessellating the second seismic plane using the GPU to generate a second plurality of geometric primitives with a second plurality of corresponding vertices, displacing vertices from the second plurality of geometric primitives of the second seismic plane based on corresponding portions of the second seismic texture using the GPU, and generating a second displacement mapped rendering of the different seismic slice using the displaced vertices from the second plurality of geometric primitives for display in the interactive three-dimensional (3D) visualization environment.

Consistent with another aspect of the invention, an apparatus may include a computing system including a central processing unit (CPU) and a graphics processing unit (GPU), and program code configured upon execution by the computing system to generate a seismic plane by generating a seismic texture for the seismic plane based on stored seismic data for a subsurface formation, tessellate the seismic plane using the GPU to generate a plurality of geometric primitives with a plurality of corresponding vertices, displace vertices from the plurality of geometric primitives of the seismic plane based on corresponding portions of the seismic texture using the GPU, and generate a displacement mapped rendering of the seismic slice using the displaced vertices for display in an interactive three-dimensional (3D) visualization environment.

In some embodiments, the program code is configured to generate the seismic plane and generate the seismic texture using the CPU. Moreover, in some embodiments, the program code is further configured to dynamically adjust a number of geometric primitives generated when tessellating the seismic plane in response to user input. In some embodiments, the program code is configured to displace the vertices further based on a scaling factor, and to dynamically adjust the scaling factor in response to user input. In addition, in some embodiments, the program code is configured to displace the vertices by offsetting the vertices based on amplitude parameters associated with the corresponding portions of the seismic texture.

In some embodiments, the GPU includes a tessellation shader, and the program code is configured to tessellate the seismic plane and displace the vertices with the tessellation shader. Moreover, in some embodiments, the tessellation shader is a programmable shader of the GPU programmed to tessellate the seismic plane. Also, in some embodiments, the GPU includes a fragment shader, and the program code is configured to generate the displacement mapped rendering of the seismic slice by mapping a value in a color lookup table for a corresponding portion of the seismic texture using the fragment shader.

Consistent with another aspect of the invention, a program product may include a computer-readable medium, and program code stored on the computer-readable medium and configured upon execution by a computing system including a central processing unit (CPU) and a graphics processing unit (GPU) to generate a seismic plane by generating a seismic texture for the seismic plane based on stored seismic data for a subsurface formation, tessellate the seismic plane using the GPU to generate a plurality of geometric primitives with a plurality of corresponding vertices, displace vertices from the plurality of geometric primitives of the seismic plane based on corresponding portions of the seismic texture using the GPU, and generate a displacement mapped rendering of the seismic slice using the displaced vertices for display in an interactive three-dimensional (3D) visualization environment.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example implementations of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

DETAILED DESCRIPTION

Figure 1:
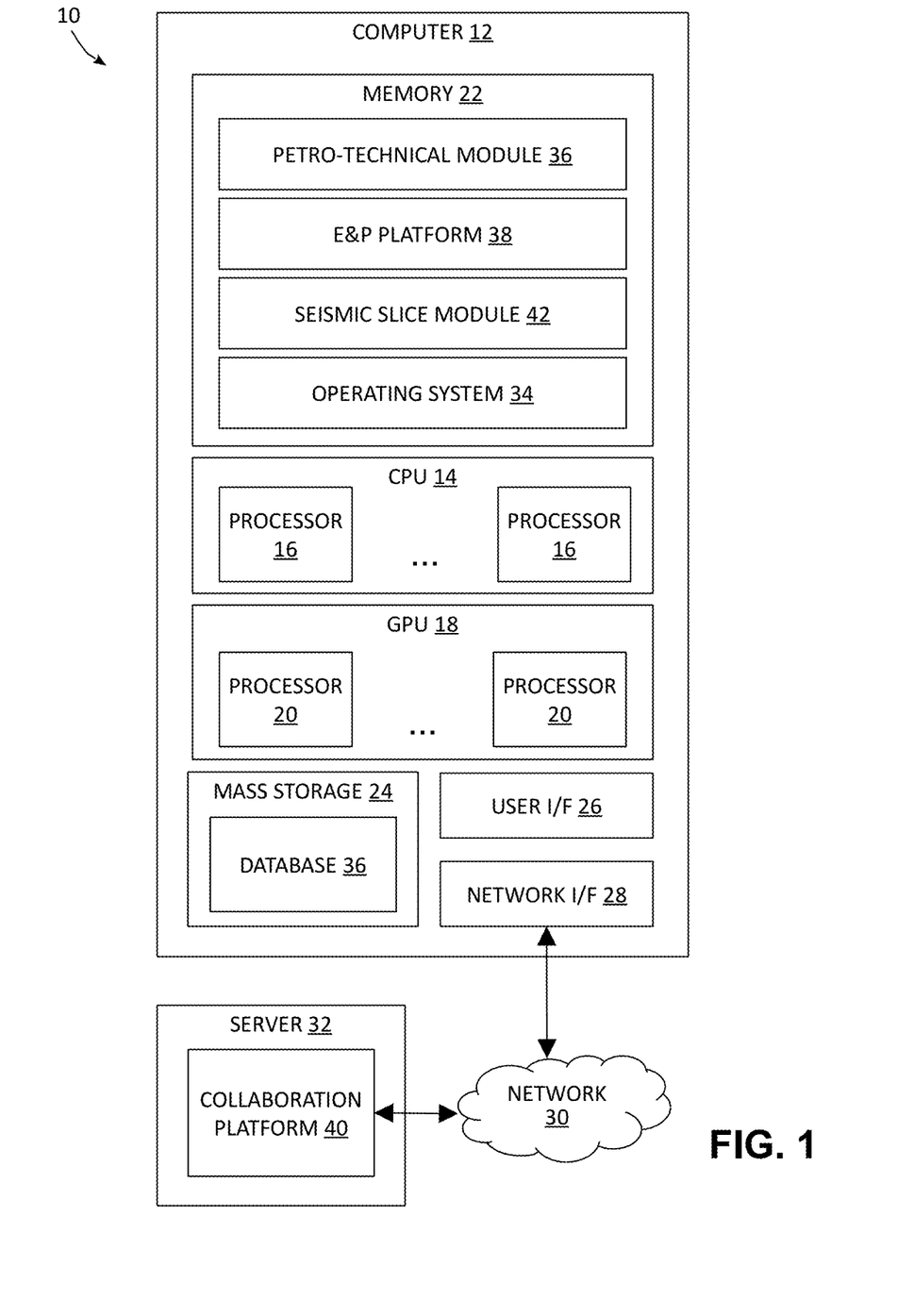
FIG. 1 is a block diagram of an example hardware and software environment for a data processing system in accordance with implementation of various technologies and techniques described herein.

Turning now to the drawings, wherein like numbers denote like parts throughout the several views, FIG. 1 illustrates an example data processing system 10 in which the various technologies and techniques described herein may be implemented. System 10 is illustrated as including one or more computers 12, e.g., client computers, each including a central processing unit (CPU) 14 including at least one hardware-based processor or processing core 16 as well as a graphics processing unit (GPU) 18 including at least one hardware based processor or processing core 20, e.g., as may be implemented in integrated graphics or in an external adapter card. CPU 14 is coupled to a memory 22, which may represent the random access memory (RAM) devices comprising the main storage of a computer 12, as well as any supplemental levels of memory, e.g., cache memories, non-volatile or backup memories (e.g., programmable or flash memories), read-only memories, etc. In addition, memory 22 may be considered to include memory storage physically located elsewhere in a computer 12, e.g., any cache memory in a microprocessor or processing core, as well as any storage capacity used as a virtual memory, e.g., as stored on a mass storage device 24 or on another computer coupled to a computer 12.

Each computer 12 also generally receives a number of inputs and outputs for communicating information externally. For interface with a user or operator, a computer 12 generally includes a user interface 26 incorporating one or more user input/output devices, e.g., a keyboard, a pointing device, a display, a printer, etc. Otherwise, user input may be received, e.g., over a network interface 28 coupled to a network 30, from one or more external computers, e.g., one or more servers 32 or other computers 12. A computer 12 also may be in communication with one or more mass storage devices 24, which may be, for example, internal hard disk storage devices, external hard disk storage devices, storage area network devices, etc.

A computer 12 generally operates under the control of an operating system 34 and executes or otherwise relies upon various computer software applications, components, programs, objects, modules, data structures, etc. For example, a petro-technical module or component 36 executing within an exploration and production (E&P) platform 38 may be used to access, process, generate, modify or otherwise utilize petro-technical data, e.g., as stored locally in a database 36 and/or accessible remotely from a collaboration platform 40. Collaboration platform 40 may be implemented using multiple servers 32 in some implementations, and it will be appreciated that each server 32 may incorporate a CPU, memory, and other hardware components similar to a computer 12.

In one non-limiting implementation, for example, E&P platform 38 may implemented as the PETREL Exploration & Production (E&P) software platform, while collaboration platform 40 may be implemented as the STUDIO E&P KNOWLEDGE ENVIRONMENT platform, both of which are available from Schlumberger Ltd. and its affiliates. It will be appreciated, however, that the techniques discussed herein may be utilized in connection with other platforms and environments, so the invention is not limited to the particular software platforms and environments discussed herein.

In many implementations, computer 12 includes seismic slice module 42 which can be utilized in rendering seismic slice(s) in real time using CPU 14 and GPU 18. In a variety of implementations, seismic slice module 42 may be used in generating a seismic plane, generating a seismic texture based on the seismic data, tessellating the seismic plane and offsetting portions of the seismic plane based on the seismic texture, as well as generating a seismic slice using the seismic texture as well as the tessellated seismic plane, as will be described in greater detail below.

In general, the routines executed to implement the implementations disclosed herein, whether implemented as part of an operating system or a specific application, component, program, object, module or sequence of instructions, or even a subset thereof, will be referred to herein as "computer program code," or simply "program code." Program code generally comprises one or more instructions that are resident at various times in various memory and storage devices in a computer, and that, when read and executed by one or more hardware-based processing units in a computer (e.g., microprocessors, processing cores, or other hardware-based circuit logic), cause that computer to perform the steps embodying desired functionality. Moreover, while implementations have and hereinafter will be described in the context of fully functioning computers and computer systems, those skilled in the art will appreciate that the various implementations are capable of being distributed as a program product in a variety of forms, and that the invention applies equally regardless of the particular type of computer readable media used to actually carry out the distribution.

Such computer readable media may include computer readable storage media and communication media. Computer readable storage media is non-transitory in nature, and may include volatile and non-volatile, and removable and non-removable media implemented in any method or technology for storage of information, such as computer-readable instructions, data structures, program modules or other data. Computer readable storage media may further include RAM, ROM, erasable programmable read-only memory (EPROM), electrically erasable programmable read-only memory (EEPROM), flash memory or other solid state memory technology, CD-ROM, DVD, or other optical storage, magnetic cassettes, magnetic tape, magnetic disk storage or other magnetic storage devices, or any other medium that can be used to store the desired information and which can be accessed by computer 10. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

Various program code described hereinafter may be identified based upon the application within which it is implemented in a specific implementation of the invention. However, it should be appreciated that any particular program nomenclature that follows is used merely for convenience, and thus the invention should not be limited to use solely in any specific application identified and/or implied by such nomenclature. Furthermore, given the endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Furthermore, it will be appreciated by those of ordinary skill in the art having the benefit of the instant disclosure that the various operations described herein that may be performed by any program code, or performed in any routines, workflows, or the like, may be combined, split, reordered, omitted, and/or supplemented with other techniques known in the art, and therefore, the invention is not limited to the particular sequences of operations described herein.

Those skilled in the art will recognize that the example environment illustrated in FIG. 1 is not intended to limit the invention. Indeed, those skilled in the art will recognize that other alternative hardware and/or software environments may be used without departing from the scope of the invention.

Oilfield Operations

Figure 2A:
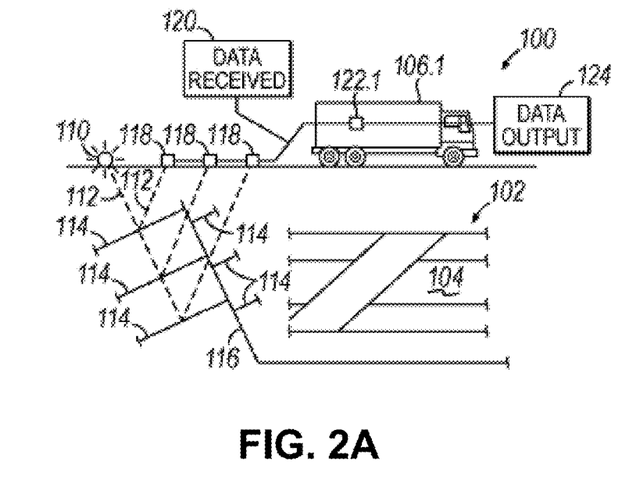
FIGS. 2A-2D illustrate simplified, schematic views of an oilfield having subterranean formations containing reservoirs therein in accordance with implementations of various technologies and techniques described herein.

FIGS. 2A-2D illustrate simplified, schematic views of an oilfield 100 having subterranean formation 102 containing reservoir 104 therein in accordance with implementations of various technologies and techniques described herein. FIG. 2A illustrates a survey operation being performed by a survey tool, such as seismic truck 106.1, to measure properties of the subterranean formation. The survey operation is a seismic survey operation for producing sound vibrations. In FIG. 2A, one such sound vibration, sound vibration 112 generated by source 110, reflects off horizons 114 in earth formation 116. A set of sound vibrations is received by sensors, such as geophone-receivers 118, situated on the earth's surface. The data received 120 is provided as input data to a computer 122.1 of a seismic truck 106.1, and responsive to the input data, computer 122.1 generates seismic data output 124. This seismic data output may be stored, transmitted or further processed as desired, for example, by data reduction.

Figure 2B:
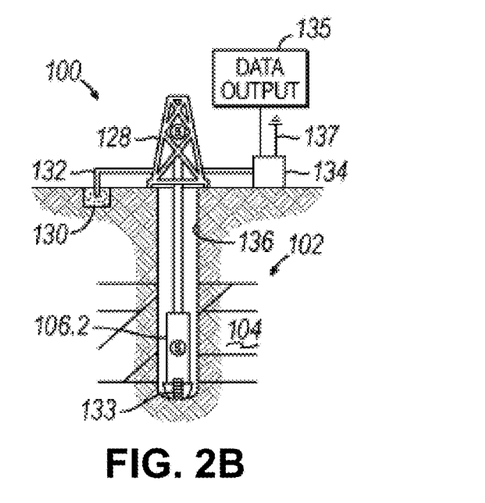

FIG. 2B illustrates a drilling operation being performed by drilling tools 106.2 suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud may be filtered and returned to the mud pit. A circulating system may be used for storing, controlling, or filtering the flowing drilling muds. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produces data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106.2 may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electro-magnetic signal, which is representative of the measured drilling parameters. It will be appreciated by one of skill in the art that a variety of telemetry systems may be employed, such as wired drill pipe, electromagnetic or other known telemetry systems.

Generally, the wellbore is drilled according to a drilling plan that is established prior to drilling. The drilling plan sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize portions of the field operation, such as controlling drilling, weight on bit, pump rates, or other parameters. These adjustments may be made automatically based on computer protocol, and/or manually by an operator. In some cases, well plans may be adjusted to select optimum operating conditions, or to avoid problems.

Figure 2C:
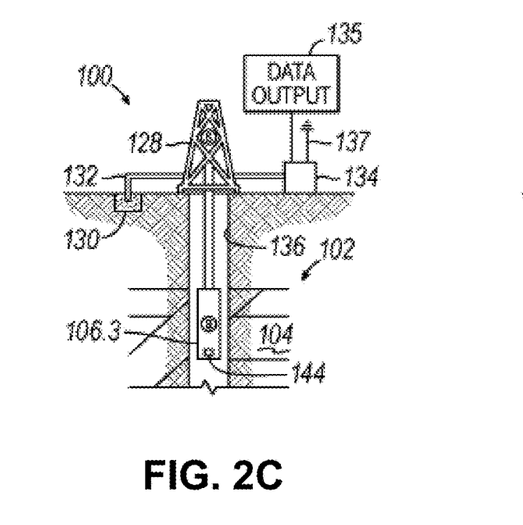

FIG. 2C illustrates a wireline operation being performed by wireline tool 106.3 suspended by rig 128 and into wellbore 136 of FIG. 2B. Wireline tool 106.3 is adapted for deployment into wellbore 136 for generating well logs, performing downhole tests and/or collecting samples. Wireline tool 106.3 may be used to provide another method and apparatus for performing a seismic survey operation. Wireline tool 106.3 may, for example, have an explosive, radio-active, electrical, or acoustic energy source 144 that sends and/or receives electrical signals to surrounding subterranean formations 102 and fluids therein.

Wireline tool 106.3 may be operatively connected to, for example, geophones 118 and a computer 122.1 of a seismic truck 106.1 of FIG. 2A. Wireline tool 106.3 may also provide data to surface unit 134. Surface unit 134 may collect data generated during the wireline operation and may produce data output 135 that may be stored or transmitted. Wireline tool 106.3 may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106.3 to measure downhole parameters which relate to, for example porosity, permeability, fluid composition and/or other parameters of the field operation.

Figure 2D:
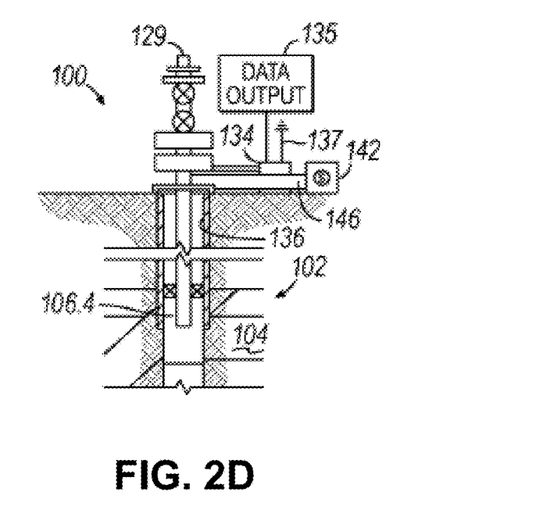

FIG. 2D illustrates a production operation being performed by production tool 106.4 deployed from a production unit or Christmas tree 129 and into completed wellbore 136 for drawing fluid from the downhole reservoirs into surface facilities 142. The fluid flows from reservoir 104 through perforations in the casing (not shown) and into production tool 106.4 in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106.4 or associated equipment, such as christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 2B-2D illustrate tools used to measure properties of an oilfield, it will be appreciated that the tools may be used in connection with non-oilfield operations, such as gas fields, mines, aquifers, storage, or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 2A-2D are intended to provide a brief description of an example of a field usable with oilfield application frameworks. Part, or all, of oilfield 100 may be on land, water, and/or sea. Also, while a single field measured at a single location is depicted, oilfield applications may be utilized with any combination of one or more oilfields, one or more processing facilities and one or more wellsites.

Figure 3:
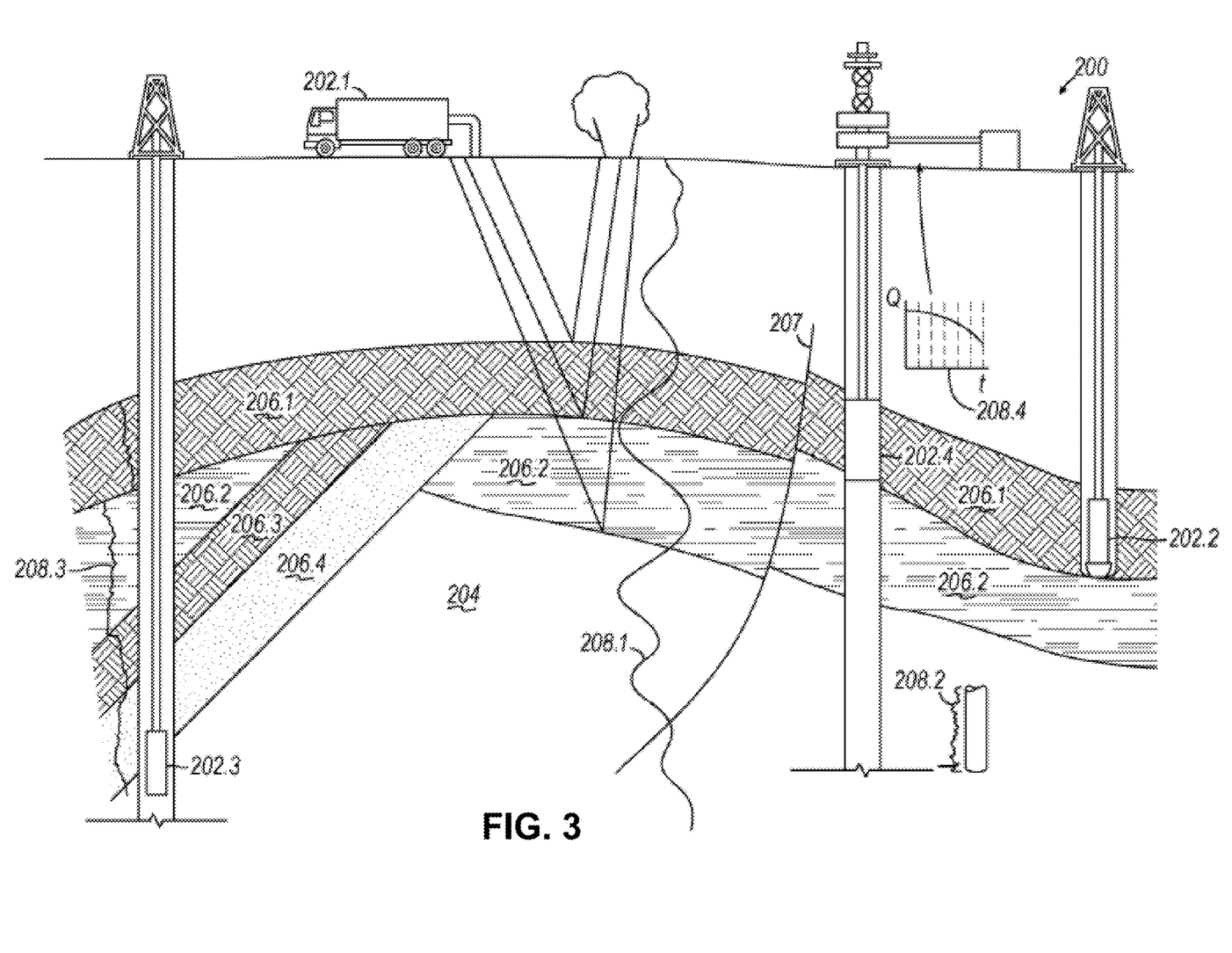
FIG. 3 illustrates a schematic view, partially in cross section of an oilfield having a plurality of data acquisition tools positioned at various locations along the oilfield for collecting data from the subterranean formations in accordance with implementations of various technologies and techniques described herein.

FIG. 3 illustrates a schematic view, partially in cross section of oilfield 200 having data acquisition tools 202.1, 202.2, 202.3 and 202.4 positioned at various locations along oilfield 200 for collecting data of subterranean formation 204 in accordance with implementations of various technologies and techniques described herein. Data acquisition tools 202.1-202.4 may be the same as data acquisition tools 106.1-106.4 of FIGS. 2A-2D, respectively, or others not depicted. As shown, data acquisition tools 202.1-202.4 generate data plots or measurements 208.1-208.4, respectively. These data plots are depicted along oilfield 200 to demonstrate the data generated by the various operations.

Data plots 208.1-208.3 are examples of static data plots that may be generated by data acquisition tools 202.1-202.3, respectively, however, it should be understood that data plots 208.1-208.3 may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208.1 is a seismic two-way response over a period of time. Static plot 208.2 is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208.3 is a logging trace that generally provides a resistivity or other measurement of the formation at various depths.

A production decline curve or graph 208.4 is a dynamic data plot of the fluid flow rate over time. The production decline curve generally provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206.1-206.4. As shown, this structure has several formations or layers, including a shale layer 206.1, a carbonate layer 206.2, a shale layer 206.3 and a sand layer 206.4. A fault 207 extends through the shale layer 206.1 and the carbonate layer 206.2. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, generally below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 3, may then be processed and/or evaluated. Generally, seismic data displayed in static data plot 208.1 from data acquisition tool 202.1 is used by a geophysicist to determine characteristics of the subterranean formations and features. The core data shown in static plot 208.2 and/or log data from well log 208.3 are generally used by a geologist to determine various characteristics of the subterranean formation. The production data from graph 208.4 is generally used by the reservoir engineer to determine fluid flow reservoir characteristics. The data analyzed by the geologist, geophysicist and the reservoir engineer may be analyzed using modeling techniques.

Figure 4:
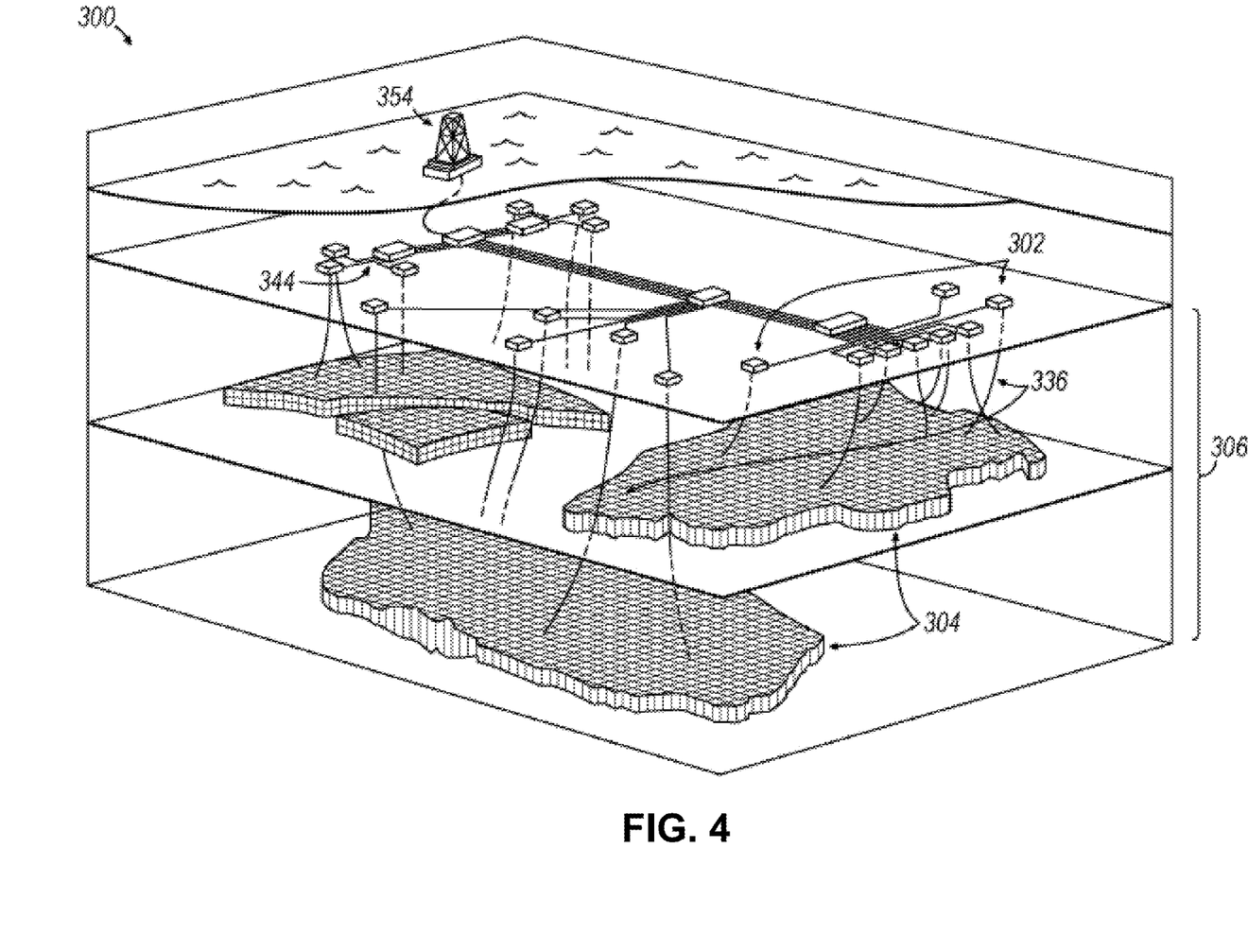
FIG. 4 illustrates a production system for performing one or more oilfield operations in accordance with implementations of various technologies and techniques described herein.

FIG. 4 illustrates an oilfield 300 for performing production operations in accordance with implementations of various technologies and techniques described herein. As shown, the oilfield has a plurality of wellsites 302 operatively connected to central processing facility 354. The oilfield configuration of FIG. 4 is not intended to limit the scope of the oilfield application system. Part or all of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Rendering Seismic Data

The ability to analyze the internals of a three-dimensional structure can be beneficial for the oil and gas industry, e.g., for viewing seismic information. Seismic data sets may be intersected by planes, so as to see a cross-section of the data, which is referred to as a seismic slice. Display of seismic slices may allow a user such as a geophysical interpreter to construct virtual subsurface structures. Subsequent workflows may use the structures to build large models of entire reservoirs and run fluid simulations in order to discover potential hydrocarbons and avenues for oil and gas production. It will also be appreciated that seismic data may be considered to include raw or processed seismic data collected from one or more seismic surveys, as well as other types of seismic data such as various attributes that may be derived from collected seismic data, e.g., data reflecting differences between seismic surveys collected at different points in time.

Image processing techniques have traditionally been utilized to render seismic slices, although oil and gas software has generally not advanced at the same rate as computer graphics hardware and software. Many computer graphics designs utilize a graphics pipeline, which is a sequence of steps that are performed to render and display a virtual model onto a computer monitor. Modern graphics pipelines eschew fixed-function designs (where pipeline stages are generally fixed, and customizable only via a few parameters) in favor of greater customization, employing programmable shaders that run as substitutes for various parts of a pipeline.

Seismic data is generally made up of a three-dimensional grid where each of the constituent cells is of equal size and contains a single scalar value at the center. Rendering a seismic slice generally involves cutting the grid with an intersection plane, determining what are the closest cell centers, and projecting the values on onto the plane. The values of the cells are turned into a texture, generally a two-dimensional grid with equal sized elements and a single scalar value, and the texture may be combined with a color table in the last stages of the graphics pipeline to produce the seismic slice. While in some instances intersection planes may be limited to orthogonal planes that intersect at cell centers, in other instances interpolation may be used when a plane does not intersect entirely at cell centers.

Seismic attributes are generally modifications of existing seismic cubes, where the values of the cell centers are the result of some computation of the original cube, which are more generally referred to as seismic attributes. These attributes can provide geophysical interpreters new insights into their data; however, viewing multiple concurrent attributes in order to glean further understanding generally requires viewing of the data side-by-side.

In many instances, as noted above, a seismic plane may be processed using a corresponding seismic texture to render a seismic slice. In many instances, a seismic plane may be defined using one or more processors of a CPU, and the seismic plane, as well as the corresponding seismic texture, may be transmitted to a GPU for rendering. A portion of the GPU, such as a programmable shader configured as a fragment shader of the GPU, may be utilized to perform a texture lookup, an interpolation, and/or a color lookup to map the seismic texture to the seismic plane. A fragment shader generally runs for each fragment, or pixel.

Figure 5:
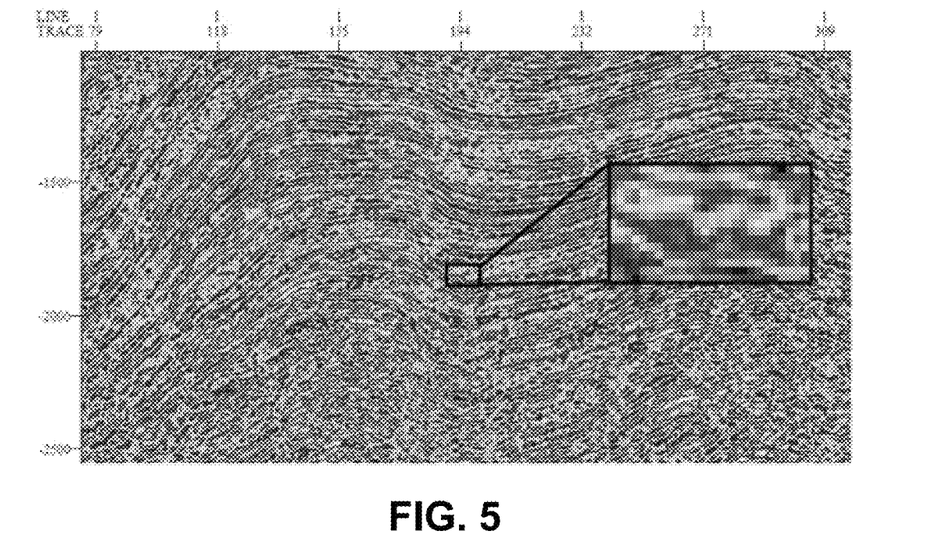
FIG. 5 illustrates an example 2D texture used to render a seismic slice.

Rendering a seismic slice as a 2D texture, however, can result in a visualization that is difficult for even an experienced geophysical interpreter to read. FIG. 5, for example, illustrates an example seismic slice visualization rendered from a 2D texture. Some conventional approaches have attempted to use various computer graphics techniques to improve the visualization of a seismic slice to provide greater realism and to make subsurface structures easier to detect, e.g., using bump mapping.

Bump mapping, for example, may be used to create small shadows along the continuities of a slice. Bump mapping generally perturbs the orientation (surface normal) of a surface constituent to give the illusion that there are depths in the texture. It should be noted, however, that bump mapping does not create actual undulations in the slice, and therefore has cases in which a user can see that it is only an illusion.

It has also been proposed to extrude the peaks and troughs of a seismic slice into a three-dimensional surface; however, such approaches have generally been tied to a single slice, and not an entire seismic cube.

Figure 6:
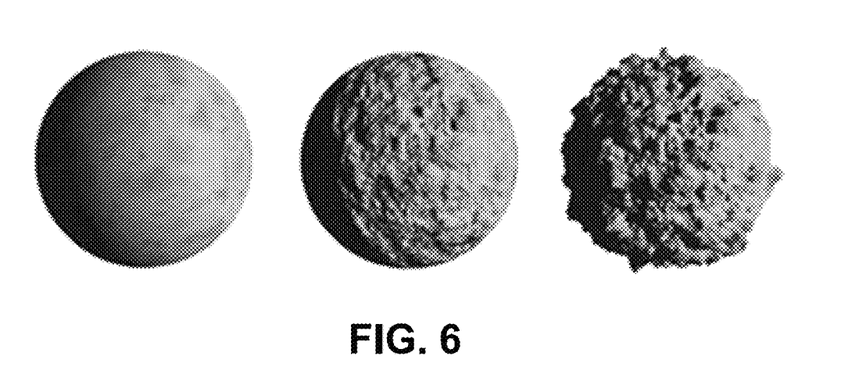
FIG. 6 illustrates bump mapping and displacement mapping applied to a 2D texture applied to a spherical object.

Embodiments consistent with the invention, in contrast, may utilize a technique referred to herein as displacement mapping to dynamically change the geometry of a seismic slice in connection with real time rendering in an interactive 3D visualization environment. In contrast to bump mapping, which only perturbs surface normals in order to make small shadows, displacement mapping may be used to generate additional geometry and distort it orthogonally to the plane of a seismic slice. As an example of the distinctions between bump and displacement mapping, FIG. 6 illustrates a 2D texture from a base model applied to a spherical object (left) with bump mapping (center) and displacement mapping (right) applied to the base model. The implementations described herein, for example, may allow for real time rendering of seismic slices in a computationally-efficient manner, using displacement mapping to extrude the seismic amplitude values, and in some instances enabling a user to slice through an entire seismic cube in real time and to distort the geometry of the plane.

Real time rendering, in this regard, refers generally to the rendering of a seismic slice in an interactive 3D visualization environment that supports both dynamically changing the view of a rendered seismic slice (e.g., by rotating, zooming in, zooming out, panning, etc.) and dynamically switching between different seismic slices (e.g., by moving an intersection plane along its normal axis). Such visualization environments may also support animation in some embodiments, although the invention is not so limited.

Figure 7:
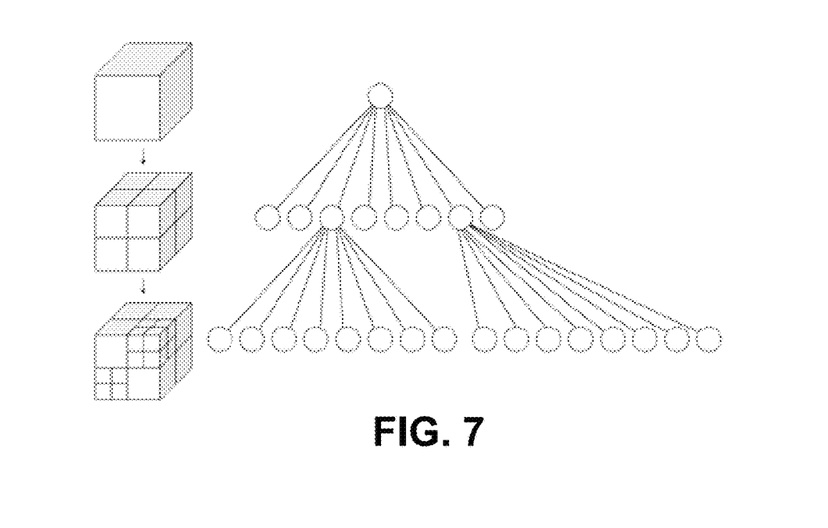
FIG. 7 illustrates an example spatially decomposed data structure suitable for storing seismic cube data in accordance with implementations of various technologies and techniques described herein.

In some embodiments, seismic slice rendering consistent with the invention may incorporate in part reading massive cubes that have been heavily level of detailed, concurrent and continuous streaming of memory between a CPU and a GPU, and pixel-resolution lookups of seismic colors on a slice. A seismic cube may be stored in a format such as the ZGY data format (which is a proprietary format and is optimized for rendering), although it will be appreciated that other data formats may be used in the alternative. In addition, in some embodiments, seismic cube data may be stored in a spatially decomposed data structure, e.g., as represented in FIG. 7. Multiple resolutions may also be stored at each level, which may allow lower resolutions to be loaded more quickly. This may enable faster data display that doesn't lock user interaction while higher resolution data are loaded.

The three-dimensional grid cells in a seismic cube may be cut by an intersection plane, the values of which are populated from the values in cells. As an example, if the intersection plane cuts the cells in the middle, then the values on the plane are identical to those in the cell centers. If the plane is between multiple cells then an interpolation may be performed. The resulting values may be stored in a two-dimensional grid, called a texture, as can be seen in FIG. 5 discussed above. In general, the values in the seismic cube and the texture are scalar.

Rendering a seismic slice in the illustrated embodiments in part may involve sending the geometry of the intersection plane and the texture of the seismic slice to the GPU, and performing a texture lookup, an interpolation, and color lookup in a programmable shader. The geometry of the intersection plane for the seismic slice may include two triangles or primitives—one of the fundamental data structure in computer graphics—which are themselves composed of a total of six points, and once the triangles have been rasterized, or mapped into the pixel space, a programmable shader called a fragment shader runs over all of the pixels that make up the triangles, and performing multiple tasks.

One task is to perform a seismic texture lookup to determine what the scalar value of the pixel is. Another task is to use the neighboring pixel texture values to perform an additional interpolation, and yet another task is to use a color table to turn the scalar value from the texture into a color space (e.g., a red-green-blue space) and emit the pixel, which is what a user will then see on the screen. This shader may be run for all pixels of all non-overlapping objects in the scene that are within the view field, which is also referred to as the frustum.

Seismic slice rendering in the illustrated embodiments also incorporates displacement mapping implemented at least partially in the GPU, which as noted above is an extension of bump mapping that displaces geometry to produce bumps, instead of just perturbing the normals. The result is a more realistic representation of the surface, which generally does not suffer from the same limits as bump mapping (e.g., non-occluding geometry, no shadows when viewed in parallel to the plane, etc.)

In general, displacement mapping requires finer resolution of an object to be rendered in order to appropriately displace the geometry. In order to increase the resolution, an object may need to be tessellated to produce a significant increase in vertices, and each of the vertices may thereafter be displaced given the scalar data in the seismic texture. It has been found, however, that displacement mapping functionality can be computationally expensive, and its suitability for use in real time rendering can vary depending upon the manner in which the functionality is allocated between a CPU and a GPU.

For example, while both tessellation and displacement may be performed in a CPU in some instances, it is believed that performing the tessellation, texture lookup, and displacement on the typical amount of seismic data in a seismic cube may be too computationally expensive to enable a real time and interactive visualization environment for many seismic cubes. Likewise, while tessellation may be performed on a CPU and texture lookups and displacements of the geometry generated by the CPU may be performed in a GPU (e.g., in a vertex shader) in some instances, it is believed that such an approach would provide an adequate interactive experience only for a single seismic slice. This is due to the fact that upon changing to a new seismic slice (e.g., by changing the plane of intersection through a seismic cube), a new tessellation would be required by the CPU, and substantial new data would need to be communicated to the GPU for texture lookup and displacement. In typically seismic interpolation workflows, however, it is often desirable to change seismic slices relatively frequently, and as such, this approach may also be too computationally expensive to enable a real time and interactive visualization environment for many seismic cubes.

As such, in some implementations, it may be desirable to implement both tessellation and displacement within a GPU, whereby a graphics pipeline of a GPU generates triangles or primitives, and the vertex position of the newly created vertices may be displaced in order to apply displacement mapping to a seismic slice. In some embodiments, for example, tessellation and displacement may be performed by one or more programmable shaders (e.g., using multiple programmable shaders) of a graphics pipeline. Furthermore, displacement mapping may be implemented in real time (which may also be considered to include near real time), thereby providing an interactive 3D visualization environment in which a user may dynamically change seismic slices and/or change the viewpoint of a given seismic slice during a seismic interpretation workflow.

In accordance with some implementations disclosed herein, for example, a tessellation shader of the GPU may be utilized to render seismic slices in real time (and/or near real time). GPU displacement mapping may utilize a tessellation shader to tessellate a seismic plane and to offset the tessellated seismic plane by an amplitude (e.g., height value) of the corresponding portion of the seismic texture. Further, in some instances, a scaling factor may be used to effectively change the amount of displacement dynamically (e.g., to increase or decrease the amount of displacement for the seismic slice). Using the tessellation shader to tessellate the seismic plane is believed to reduce the time to render a seismic slice by replacing the computationally intensive and time intensive step of tessellating the seismic plane with the CPU each time a user changes the view of the seismic slices, changes the resolution of the seismic slices, and/or changes between seismic slices.

Figure 8:
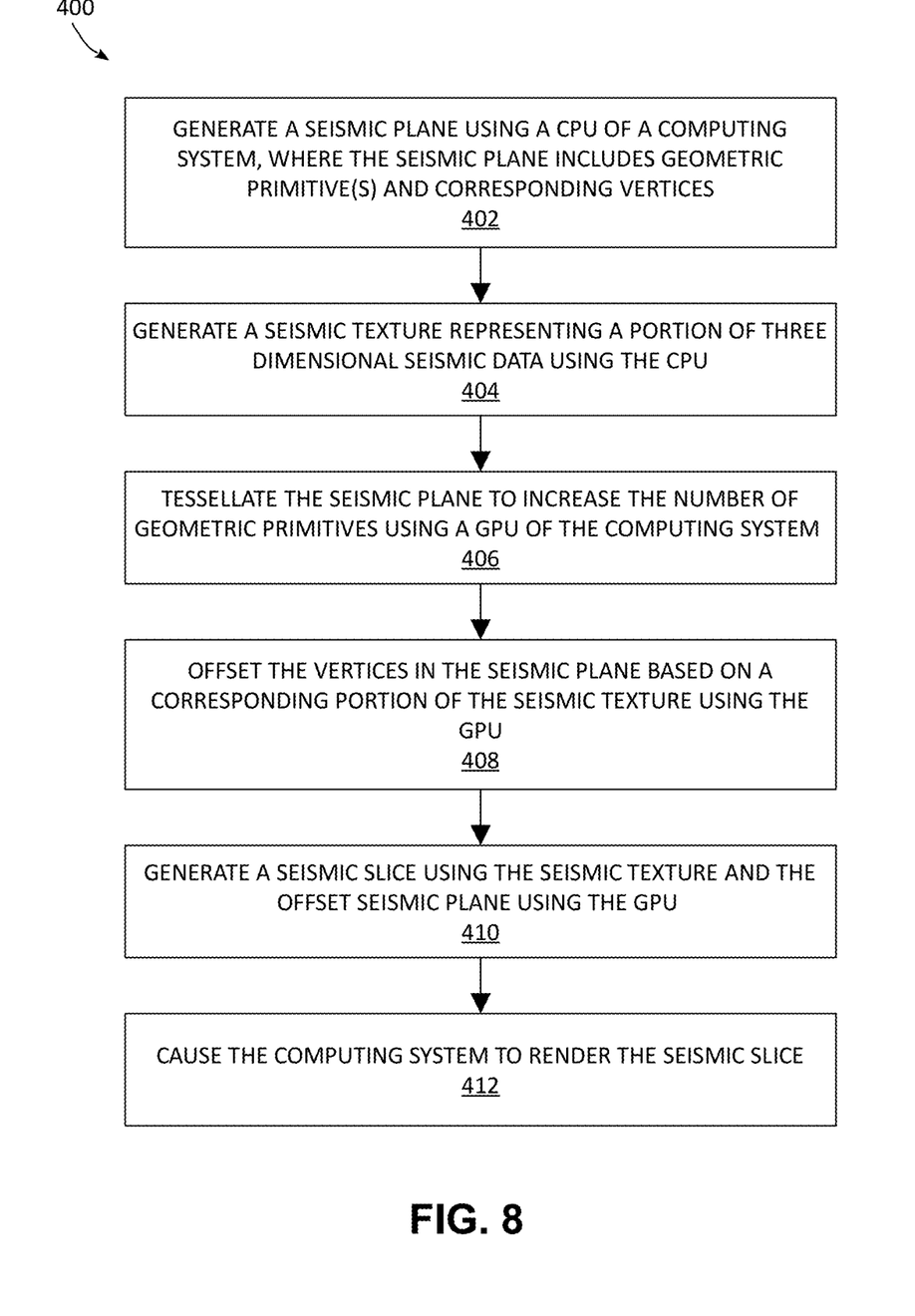
FIG. 8 is a flowchart illustrating an example sequence of operations for rendering a seismic slice using the data processing system of FIG. 1.

As shown in FIG. 8, an example process 400 is illustrated suitable for implementation on computer 12 for rendering seismic slices using GPU displacement mapping in real time. Process 400 may begin at block 402 by generating a seismic plane, e.g., using a CPU of a computing system. In many implementations, a seismic plane includes one or more geometric primitives as well as vertices corresponding to those primitives. Geometric primitives may include a variety of geometric shapes such as lines, points, and/or triangles. For example, in a variety of implementations, a seismic plane may be defined using two triangles with four corresponding vertices, or alternatively, a two-dimensional array of multiple triangles.

Next, at block 404, a seismic texture representing a portion of the three-dimensional seismic data may be generated, e.g., using the CPU. In a variety of implementations, seismic data may be represented as a three-dimensional grid of equal sized cells, where each cell in the grid contains a single scalar value which may correspond to an amplitude measured during the seismic survey. In some such implementations, the seismic data may be stored in a ZGY data format, where multiple resolutions of the seismic data are stored at each level to allow lower resolutions of the seismic data to be loaded more quickly. Additionally or alternatively, a seismic texture may represent an intersection of the seismic data with an intersection plane. In many implementations, the seismic texture may be a two-dimensional grid with equal sized elements. Each element may contain a single scalar value based on corresponding portion(s) of the seismic data. For example, when the intersection plane cuts a seismic data cell in the middle, the value of the seismic texture element may be equal to the value of the seismic data cell. Additionally or alternatively, when the intersection plane does not cut through the middle of a seismic data cell, the value of the seismic texture element may represent an interpolation of the values of multiple seismic data cells intersected by the intersection plane. Alternatively, intersection planes may be limited to intersecting at data cell centers, whereby no interpolation is performed.

Next, at block 406, the seismic plane may be tessellated using a GPU of the computing system. In many implementations, a tessellation shader of the GPU (e.g., a programmable shader programmed to perform tessellation) may tessellate the seismic plane. Tessellating the seismic plane increases the number of geometric primitives (e.g., triangles, vertices, etc.) of the seismic plane (and thus may increase the resolution in the rendered seismic slice). For example, a seismic plane defined using two triangles and four vertices using the CPU may be tessellated using the tessellation shader of the GPU to increase the number of triangles as well as the number of vertices in the seismic plane. In a variety of implementations, a user may dynamically determine the number of primitives of the tessellated seismic plane, e.g., via a setting, or the number of primitives may be varied dynamically based upon the current view. It will be appreciated that programming a programmable shader of a GPU to implement tessellation functionality would be well within the abilities of those of ordinary skill having the benefit of the instant disclosure.

Next, at block 408, one or more of the vertices of the tessellated seismic plane may be displaced or offset using the GPU. In many implementations, the tessellation shader of the GPU may be utilized in offsetting vertices of the seismic plane. In several implementations, the offset of each vertex is based on a corresponding portion of the seismic texture such as the amplitude of the corresponding seismic texture element. A vertex may be offset to increase the height of the vertex, decrease the height of the vertex, or may not be offset. By changing the height of vertices in the seismic plane, bumps may be formed on the seismic plane. In addition, as noted above, the offset may also be based upon a scaling factor, thereby enabling the amount of displacement to be dynamically varied, e.g., based upon a setting or a current view, thereby enabling the amount of displacement to be varied based upon a user's preferences. It will be appreciated that block 408 may be implemented by a programmable shader of a GPU in some embodiments, and that programming a programmable shader of a GPU to implement displacement functionality would be well within the abilities of those of ordinary skill having the benefit of the instant disclosure.

Next, at block 410, a seismic slice may be generated using the displaced vertices generated in block 408, e.g., using the GPU. In many implementations, a fragment shader of the GPU may be utilized in generating the seismic slice. For example, a value in a color lookup table for a corresponding portion (e.g., for each corresponding pixel) of the seismic texture may be mapped to each portion of the offset seismic plane (e.g., mapped to each corresponding pixel in the seismic plane).

Next, at block 412, the computing system may render the seismic slice for the user, e.g., on one or more displays of the computing system. In some implementations, the rendering may include generating a displacement mapped rendering of the seismic slice using the displaced vertices. In a variety of implementations, the seismic slice is rendered in real time (or near real time) within an interactive three-dimensional (3D) visualization environment. Additionally or alternatively, the seismic slice may be rendered via GPU displacement mapping with fewer CPU processor cycles compared to CPU displacement mapping of the same seismic slice via the same computing system. In addition, it will be appreciated that in some embodiments a displacement mapped rendering of a seismic slice may be displayed on a computing system other than that which generated the rendering, e.g., where a server generates the rendering for display on a client computer.

It will also be appreciated that, as the seismic slice is rendered in an interactive three-dimensional visualization environment, process 400 may be repeated any time a user changes the seismic slice to be displayed, resulting in the generation and rendering of a new seismic slice in real time.

Figure 9:
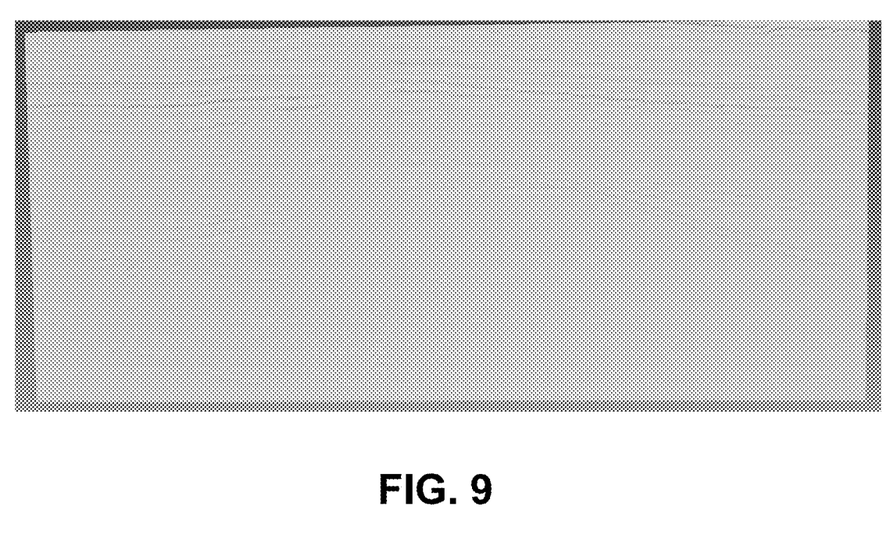
FIG. 9 illustrates an example seismic slice generated without displacement mapping.
Figure 10:
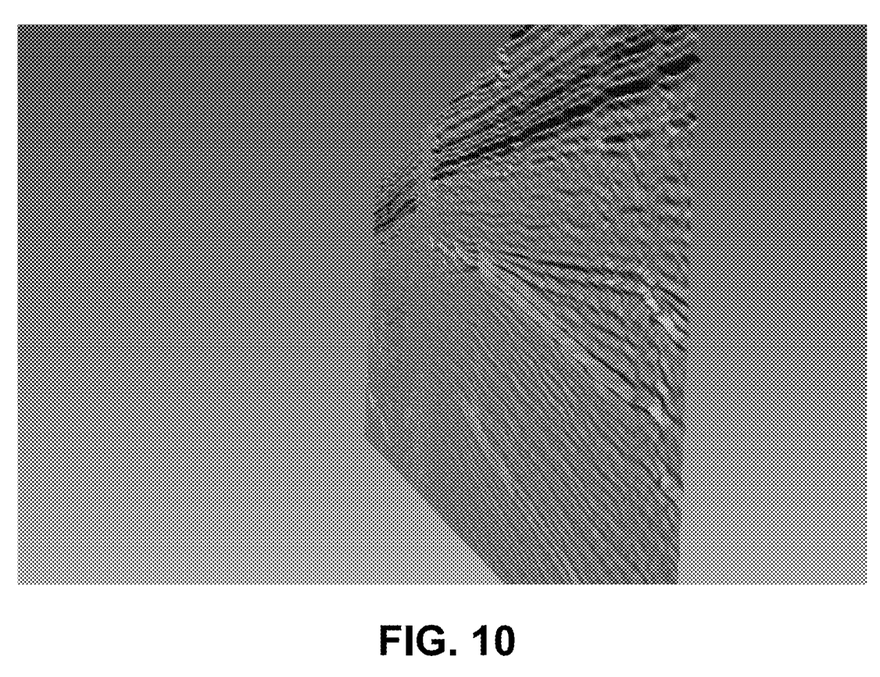
FIG. 10 illustrates an example seismic slice generated using displacement mapping in accordance with implementations of various technologies and techniques described herein.

With reference to FIGS. 9 and 10, FIG. 9 illustrates an example seismic slice with a 2D seismic texture generated therefor, and lacking any displacement mapping. FIG. 10 illustrates the same seismic texture rendered using displacement mapping, e.g., as implemented in the manner described above, and rotated to illustrate the three-dimensional displacement of seismic data from the plane of the seismic slice.

It will be appreciated that when both tessellation and displacement are performed in a GPU in the manner described herein, significant performance gains may be achieved. In an approach where, for example, tessellation is implemented within a CPU, a large number of resulting primitives or triangles would need to be sent to the GPU for a seismic slice, such that changing the seismic slice (which may occur frequently during interactive interpretation) would result in an entirely new batch of primitives or triangles being generated by the CPU and sent to the GPU. In contrast, using programmable shaders on the GPU to perform tessellation substantially reduces the traffic between the CPU and GPU, both for the initial primitive or triangle batch, and for each subsequent batch.

Although the preceding description has been described herein with reference to particular means, materials, and implementations, it is not intended to be limited to the particular disclosed herein. By way of further example, implementations may be utilized in conjunction with a handheld system (i.e., a phone, wrist or forearm mounted computer, tablet, or other handheld device), portable system (i.e., a laptop or portable computing system), a fixed computing system (i.e., a desktop, server, cluster, or high performance computing system), or across a network (i.e., a cloud-based system). As such, implementations extend to all functionally equivalent structures, methods, uses, program products, and compositions as are within the scope of the appended claims. In addition, while particular implementations have been described, it is not intended that the invention be limited thereto, as it is intended that the invention be as broad in scope as the art will allow and that the specification be read likewise. It will therefore be appreciated by those skilled in the art that yet other modifications could be made without deviating from its spirit and scope as claimed.

What is claimed is:

1. A method of rendering a seismic slice in real time, the method comprising:
   generating a seismic plane, including generating a seismic texture for the seismic plane based on stored seismic data for a subsurface formation;
   tessellating the seismic plane using a graphics processing unit (GPU) to generate a plurality of geometric primitives with a plurality of corresponding vertices;
   displacing vertices from the plurality of geometric primitives of the seismic plane based on corresponding portions of the seismic texture using the GPU, wherein displacing the vertices includes offsetting the vertices based on amplitude parameters associated with the corresponding portions of the seismic texture; and
   generating a displacement mapped rendering of the seismic slice using the displaced vertices for display in an interactive three-dimensional (3D) visualization environment.

2. The method of claim 1, wherein generating the seismic plane and generating the seismic texture are performed using a central processing unit (CPU) coupled to the GPU.

3. The method of claim 1, wherein generating the seismic plane includes generating one or more geometric primitives, and wherein tessellating the seismic plane generates additional geometric primitives to those generated when generating the seismic plane.

4. The method of claim 1, further comprising dynamically adjusting a number of geometric primitives generated when tessellating the seismic plane in response to user input.

5. The method of claim 1, wherein displacing the vertices is further based on a scaling factor, the method further comprising dynamically adjusting the scaling factor in response to user input.

6. The method of claim 1, wherein the GPU includes a tessellation shader, and wherein tessellating the seismic plane is performed by the tessellation shader.

7. The method of claim 6, wherein displacing the vertices is performed by the tessellation shader.

8. The method of claim 6, wherein the tessellation shader is a programmable shader of the GPU programmed to tessellate the seismic plane.

9. The method of claim 1, wherein the GPU includes a fragment shader, and wherein generating the displacement mapped rendering of the seismic slice includes mapping a value in a color lookup table for a corresponding portion of the seismic texture using the fragment shader.

10. The method of claim 1, further comprising, subsequent to generating the displacement mapped rendering of the seismic slice:
  receiving user input that selects a different seismic slice;
  in response to receiving the user input, generating a second seismic plane, including generating a second seismic texture for the second seismic plane based on the stored seismic data for the subsurface formation;
  tessellating the second seismic plane using the GPU to generate a second plurality of geometric primitives with a second plurality of corresponding vertices;
  displacing vertices from the second plurality of geometric primitives of the second seismic plane based on corresponding portions of the second seismic texture using the GPU; and
  generating a second displacement mapped rendering of the different seismic slice using the displaced vertices from the second plurality of geometric primitives for display in the interactive three-dimensional (3D) visualization environment.

11. An apparatus, comprising:
  a computing system including a central processing unit (CPU) and a graphics processing unit (GPU); and
  program code configured upon execution by the computing system to:
    generate a seismic plane by generating a seismic texture for the seismic plane based on stored seismic data for a subsurface formation;
    tessellate the seismic plane using the GPU to generate a plurality of geometric primitives with a plurality of corresponding vertices;
    displace vertices from the plurality of geometric primitives of the seismic plane based on corresponding portions of the seismic texture using the GPU, wherein to displace the vertices includes to offset the vertices based on amplitude parameters associated with the corresponding portions of the seismic texture; and
    generate a displacement mapped rendering of the seismic slice using the displaced vertices for display in an interactive three-dimensional (3D) visualization environment.

12. The apparatus of claim 11, wherein the program code is configured to generate the seismic plane and generate the seismic texture using the CPU.

13. The apparatus of claim 11, wherein the program code is further configured to dynamically adjust a number of geometric primitives generated when tessellating the seismic plane in response to user input.

14. The apparatus of claim 11, wherein the program code is configured to displace the vertices further based on a scaling factor, and to dynamically adjust the scaling factor in response to user input.

15. The apparatus of claim 11, wherein the GPU includes a tessellation shader, and wherein the program code is configured to tessellate the seismic plane and displace the vertices with the tessellation shader.

16. The apparatus of claim 15, wherein the tessellation shader is a programmable shader of the GPU programmed to tessellate the seismic plane.

17. The apparatus of claim 11, wherein the GPU includes a fragment shader, and wherein the program code is configured to generate the displacement mapped rendering of the seismic slice by mapping a value in a color lookup table for a corresponding portion of the seismic texture using the fragment shader.

18. A program product, comprising:
  a non-transitory computer-readable medium; and
  program code stored on the computer-readable medium and configured upon execution by a computing system including a central processing unit (CPU) and a graphics processing unit (GPU) to:
    generate a seismic plane by generating a seismic texture for the seismic plane based on stored seismic data for a subsurface formation;
    tessellate the seismic plane using the GPU to generate a plurality of geometric primitives with a plurality of corresponding vertices;
    displace vertices from the plurality of geometric primitives of the seismic plane based on corresponding portions of the seismic texture using the GPU, wherein to displace the vertices includes to offset the vertices based on amplitude parameters associated with the corresponding portions of the seismic texture; and
    generate a displacement mapped rendering of the seismic slice using the displaced vertices for display in an interactive three-dimensional (3D) visualization environment.

19. The method of claim 1, comprising sequentially progressing through 3D seismic data and simultaneously generating distorted seismic planes by displacing vertices of corresponding seismic planes of the 3D seismic data.

* * * * *